J. C. DAVIDSON.
STEERING WHEEL ATTACHMENT.
APPLICATION FILED APR. 2, 1919.
1,323,680.
Patented Dec. 2, 1919.
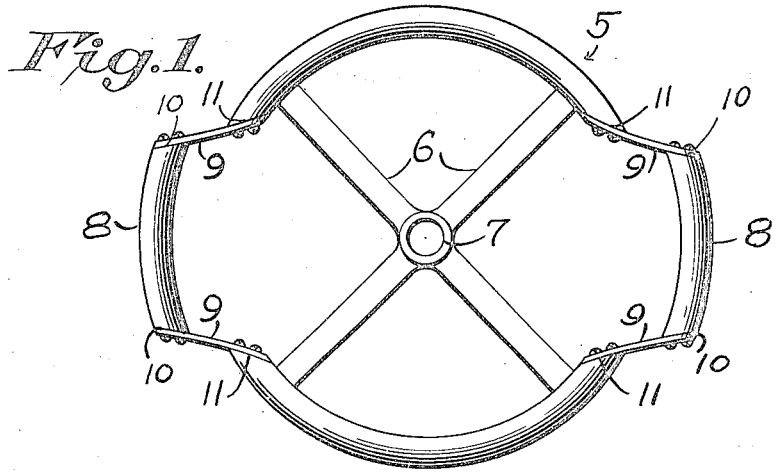
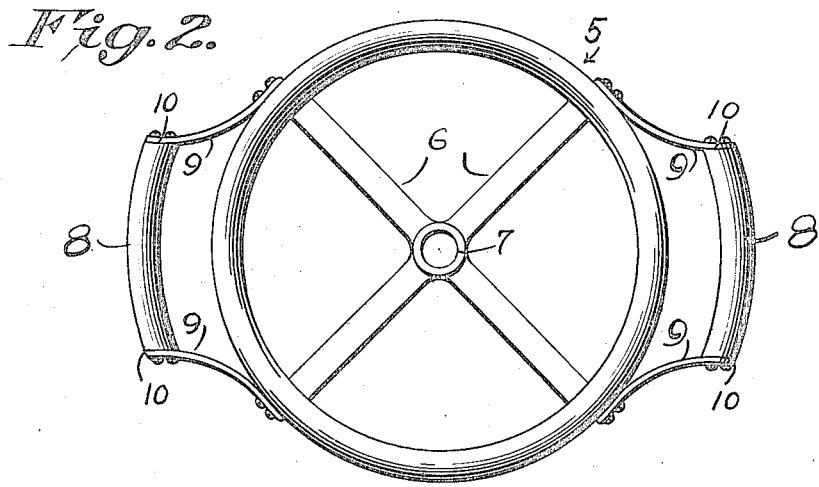
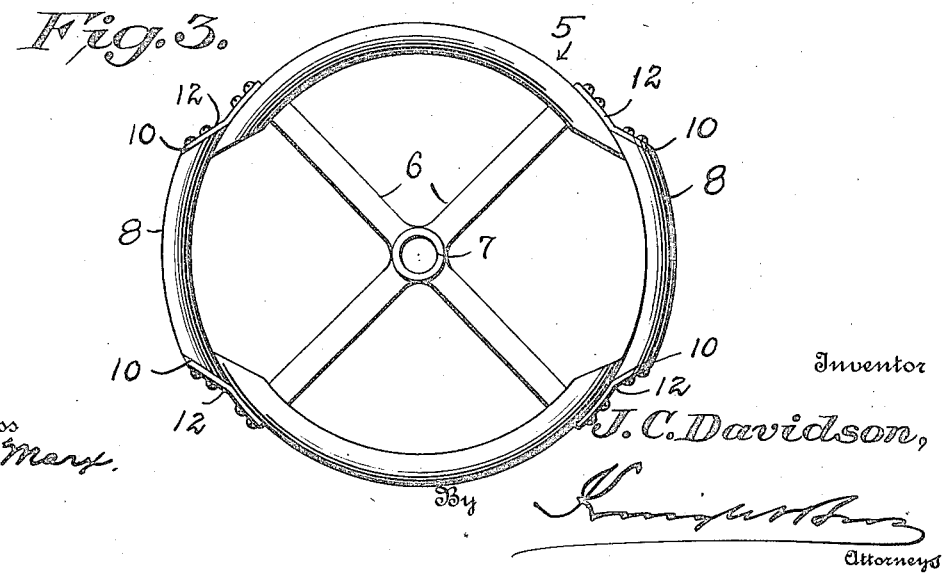
Witness
T. A. Marx.
Inventor
J. C. Davidson,
By
Attorneys

UNITED STATES PATENT OFFICE.

JOHN C. DAVIDSON, OF HAY SPRINGS, NEBRASKA.

STEERING-WHEEL ATTACHMENT.

1,323,680. Specification of Letters Patent. Patented Dec. 2, 1919.

Application filed April 2, 1919. Serial No. 286,875.

*To all whom it may concern:*

Be it known that I, JOHN C. DAVIDSON, a citizen of the United States, and a resident of Hay Springs, in the county of Sheridan and State of Nebraska, have invented certain new and useful Improvements in Steering-Wheel Attachments, of which the following is a specification.

The present invention relates particularly to an attachment for steering wheels of automobiles. Although its application is especially adapted to this use, it is not limited to any degree to automobile steering wheels, as it may be found to be equally advantageous to use the attachment on other wheels, where it is desirable to increase the diameter of the wheel to provide for a greater leverage in manipulation.

It so happens that certain types of automobiles are constructed with steering wheels of small diameter, and in driving an automobile of this type the small diameter of the wheel sometimes causes an undue hardship on the chauffeur, whereas, if the wheel were larger the steering would be comparatively easier. The present invention has for its object to provide means for increasing the size of the wheel in a cheap and neat manner.

Another object of the invention is to so construct the attachment that, when applied, it will be firmly held to the wheel without lost motion or danger of becoming accidentally removed.

Several embodiments of the invention are illustrated in the accompanying drawing, in which—

Figure 1 represents the preferred form of my invention;

Fig. 2 is a modified form; and

Fig. 3 represents still another modified form.

Referring to the drawings in detail, 5 represents an automobile steering wheel of any conventional design, having the usual spokes 6 and the bearing 7 for mounting the wheel on the steering post. Referring to the form of the invention illustrated in Fig. 1, I propose to cut away opposite sections of the rim, preferably between the spokes, and to offset these cut-away sections to provide hand grips 8. These grips are offset from the cut-away portion by suitable braces 9, which are attached to the beveled ends 10 of the grips by screws, and likewise to the ends of the rim, as at 11. Bolts or any other simple attaching means may be employed in place of screws. Furthermore, the braces need not be attached to the beveled ends of the rim, but instead may be attached to the side of the rim in a manner as shown in Fig. 2 (to be hereinafter described). The attaching means is more or less a secondary consideration, the principal features residing in increasing the diameter of the wheel in a simple and inexpensive manner, and in this connection, while I consider the form just described as the preferred form, a construction similar to that shown in Fig. 2 would also prove an advantage. In this form I do not cut away any portion of the rim, but apply the hand grips 8 by securing the braces 9 to the sides of the rim, thus leaving the rim intact.

Still another idea is conveyed in Fig. 3, in which I cut away opposite sections of the rim, as in Fig. 1, but join the grips 8 directly to the rim by means of short braces 12, which are attached in a manner similar to attaching the longer braces. In this form the grips, while being offset, are closer to the rim; thus, the leverage is not increased to the same degree as in the other forms.

In all three forms I propose to use wood for the hand grips, and prefer to use the cut-away sections of the rim when employing the forms shown in Fig. 1 and 2, but the idea need not be carried out in practice, as the grips may be produced from metal, fiber or other material, should occasion demand it.

Claims:

1. In combination with a steering wheel, of means engaging opposite portions of the rim thereof adapted to increase the diameter of the wheel, said means providing a pair of substantially elongated hand grips.

2. A steering wheel, having a portion of its rim cut away, and a hand grip offset from said cut-away portion and attached to the rim, said grip adapted to increase the diameter of the wheel.

3. A steering wheel, having a portion of its rim between the spokes cut away, a hand grip having means offsetting it from said cut-away portion and attaching it to the rim, said attaching means comprising a pair of braces.

4. A steering wheel, having a portion of its rim between the spokes cut away, a hand grip having means offsetting it from said cut-away portion and attaching it to the rim, said attaching means comprising a pair of braces attached to the ends of the hand grip and the wheel rim.

5. A steering wheel having opposite portions of its rim cut away, a pair of elongated hand grips having means offsetting them from said cut-away portions and attaching them to the rim, said means comprising braces attached to the ends of the hand grips and the wheel rim.

6. A steering wheel having opposite sections of its rim cut away and offset from the rim by braces attached to the ends of the sections and the wheel rim.

JOHN C. DAVIDSON.